3,312,594
LONGLASTING TROCHE
Gilman Norman Cyr, New Brunswick, and James Ling Chen, Milltown, N.J., assignors, by mesne assignments, to E. R. Squibb & Sons, Inc., New York, N.Y., a corporation of Delaware
No Drawing. Filed June 21, 1963, Ser. No. 289,707
10 Claims. (Cl. 167—82)

This invention relates to longlasting troches or pastilles. By longlasting troche is meant one which does not disintegrate or lose its integrity for 30 minutes or more. According to this invention, troches or pastilles are prepared which provide a vehicle for various medicaments used in treating the oral cavity or for sublingual or transbuccal administration lasting for periods of 30 minutes to about 8 hours.

A longlasting troche is useful in numerous ways. At least three areas of use include the following:
(1) Local therapy.
(2) Systematic therapy via sublingual or transbuccal absorption to avoid injection or gastrointestinal destruction.
(3) Systematic therapy by sustained release effect.

The longlasting troches of this invention may be used locally for treatment therapeutically of oral conditions such as oral lesions, oral moniliasis, stomatitis and the like. Thus anti-inflammatory steroids, antibiotics and antiseptics may be applied in this manner. Local anesthetics or other agents for dental procedures in preparation for oral surgery or for management of post-operative oral surgery problems may also be applied by this means. This form may also be used prophylactically, e.g., for administration of fluorides or other substances for prevention of dental caries and vitamins for local application. For such local applications the troche maintains the medicament in contact with or close to the site requiring treatment.

Many medicaments cannot be administered by conventional oral dosage forms such as tablets, capsules or by means of oral liquid vehicles because they are destroyed or inactivated in the gastrointestinal tract before they can be absorbed. Insulin and heparin are prime examples of this. It has been reported, however, that absorption of insulin and heparin has been effected by perlingual absorption. A longlasting troche which release its medicament in close contact with the oral mucosa is useful as a means of getting therapeutic agents into the blood stream via the buccal sulcus or sublingually, thus bypassing the gut.

Longlasting troches also provide a means for slowly and gradually releasing an active component and thereby prolonging the duration of systemic action of various therapeutic agents which may be administered orally for absorption in the gastrointestinal tract.

The longacting troches or pastilles of this invention are composed of approximately equal proportions of pectin, gelatin and carboxymethylcellulose, especially sodium carboxymethylcellulose, as the major components exclusive of medicament. These three substances together with the medicament are thoroughly admixed and reduced to a powder in which all of the components are of approximately the same particle size. The powder is then compressed into the desired size and shape on a tablet press. The powder is of the order of about 20 to 100 mesh size.

These troches disintegrate very slowly in the mouth. They adhere to the mucous membrane if allowed to remain undisturbed long enough for a surface mucilage to form and in this manner are particularly effective in obtaining continuous medication of an oral lesion, for instance. They may, of course, be dislodged with the tongue if desired.

The size and shape of the troche depend upon the time of release and type of action intended. The proportion of the three troche forming ingredients—pectin, gelatin and carboxymethylcellulose—are maintained at about equal proportions, e.g., each member is present within the range of about 30 to 40% of the total of all three (on a weight basis). The period of time which the troche will last is in general related to the size; the larger the troche, the longer it will take to disintegrate.

The shape of the troche may also be varied according to the use intended. It may be in the form of a large round tablet, a square of the lozenge type, a ball such as the familiar candy "jawbreakers" or capsule shaped, but the square type is in general preferred.

Lubricants, binders, dyes and granulating agents may be added according to conventional procedures as aids in producing the desired product, but these are present in minor amounts as optional ingredients for convenience purposes.

The medicament, as mentioned previously, is admixed with the powder prior to compression. The proportion of medicament, in general present as a minor amount of the total composition, is dependent upon the particular substance used, its required dosage regimen and period over which release is planned. This, however, is readily designed by the pharmaceutical chemist from knowledge of the medicament and its activity.

A wide variety of medicaments may be incorporated in the troche. These include drugs for local therapy, for example, local anesthetics such as dibucaine, lidocaine, parethoxycaine, diperodon, benzocaine, etc., anti-inflammatory agents, e.g., hormones and other steroids such as hydrocortisone, triamcinolone, triamcinolone acetonide, etc., antibacterial agents, e.g., antibiotics such as gramicidin, thiostrepton, amphotericin, tetracycline, etc., sulfonamides such as sulfamerazine, sulfamethazine, sulfisoxazole, etc., antiseptics such as chlorhydroxyquinoline, hexachlorophene, thimersal, boric acid, cetylpyridinium chloride, hexylresorcinol, Bradosol, etc., fluorides such as stannous fluoride and sodium monofluorophosphate, vitamins such as vitamin A, vitamin C, etc., antihistamines such as tripelennamine, chlorpheniramine, etc.

Examples of medicaments for systemic absorption sublingually or transbucally include insulin, heparin, vasoconstrictors such as epinephrine, sex hormones and other hormones, vitamin $B_{12}$ and other vitamins, oxytocin, etc.

Medicaments such as those described above may also be combined. There may also be provided a coating containing a higher proportion of medicament for immediate availability to provide a peak level at the onset.

The following examples are illustrative of the invention.

EXAMPLE 1

The following materials are thoroughly admixed in a blender:

| | Gm. |
|---|---|
| Sodium carboxymethylcellulose | 330 |
| Pectin | 330 |
| Gelatin | 330 |
| Magnesium stearate | 10 |

After mixing, the powder is compressed in a Stokes machine to form round troches of 500 mg. each.

EXAMPLE 2

The following ingredients are made up into square troches:

| | Gm. |
|---|---|
| Dibucaine base, fine powder | 30 |
| Pectin | 320 |

| | |
|---|---|
| Gelatin | 320 |
| Sodium carboxymethylcellulose | 320 |
| Magnesium stearate | 10 |

The pectin, gelatin and sodium carboxymethylcellulose are thoroughly admixed. The dibucaine base and magnesium stearate are added to and admixed with about 10% of the pectin-gelatin-carboxymethylcellulose mixture. This powder concentrate is then admixed with the remainder of the mixture. After thorough mixing, the material is compressed into square troches, each weighing 350 mg. and containing 10.5 mg. of dibucaine.

EXAMPLE 3

Troches are prepared from the following ingredients:

| | | |
|---|---|---|
| Triamcinolone acetonide | mg | 375 |
| Pectin | gm | 324.875 |
| Gelatin | gm | 324.875 |
| Sodium carboxymethylcellulose | gm | 324.875 |

The triamcinolone acetonide is admixed with approximately 10 gm. of pectin. The remainder of the pectin and the other ingredients are added and all are thoroughly mixed. The mixture is compressed into capsule-shaped troches each weighing 750 mg. and containing 0.25 mg. of triamcinolone acetonide.

EXAMPLE 4

The following ingredients are used to make capsule-shaped troches each weighing 325 mg. and containing 30 units of insulin:

| | | |
|---|---|---|
| Crystalline zinc insulin (22.9 $\mu$/mg.) | mg | 131 |
| Pectin | gm | 10.7 |
| Gelatin | gm | 10.7 |
| Sodium carboxymethylcellulose | gm | 10.7 |

The pectin, gelatin and sodium carboxymethylcellulose are admixed. The insulin is then thoroughly mixed with 5 gm. of the mixture to form a concentrate. This concentrate is then mixed with the remaining ingredients and compressed into troches.

What is claimed is:
1. A longlasting compressed powder troche comprising pectin, gelatin and carboxymethylcellulose.
2. A longlasting troche consisting essentially of a compressed powder of approximately equal parts by weight of pectin, gelatin and carboxymethylcellulose as the major components.
3. A longlasting troche consisting essentially of a compressed powder and approximately equal parts by weight of pectin, gelatin and carboxymethylcellulose as the major components and a medicament.
4. A troche as in claim 3 wherein the medicament is dibucaine.
5. A troche as in claim 3 wherein the medicament is triamcinolone acetonide.
6. A troche as in claim 3 wherein the medicament is zinc insulin.
7. A troche as in claim 3 wherein the medicament is an antibiotic.
8. A longlasting troche which comprises as the major components pectin, gelatin and sodium carboxymethylcellulose, each of said components being present in a proportion of about 30% to 40% by weight, compressed into the form of a troche.
9. A longlasting troche consisting essentially of a minor amount of medicament and a major amount of approximately equal parts by weight within the range of about 30% to 40% of pectin, gelatin and sodium carboxymethylcellulose compressed into troche form.
10. A troche as in claim 9 wherein the medicament is an antibacterial agent.

References Cited by the Examiner

UNITED STATES PATENTS

| | | | |
|---|---|---|---|
| 2,749,274 | 6/1956 | Buckwalter | 167—82 |
| 2,798,838 | 7/1957 | Robinson | 167—82 |
| 2,949,401 | 8/1960 | Wershaw | 167—82 |
| 3,062,720 | 11/1962 | Costello | 167—82 |

ALBERT T. MEYERS, *Primary Examiner.*

FRANK CACCIAPAGLIA, *Examiner.*

G. A. MENTIS, *Assistant Examiner.*